(12) United States Patent
Sharma et al.

(10) Patent No.: US 12,080,038 B2
(45) Date of Patent: Sep. 3, 2024

(54) SYSTEM AND METHOD FOR AUGMENTED DECISION MAKING BY DETECTING OCCLUSIONS

(71) Applicant: GM Global Technology Operations LLC, Detroit, MI (US)

(72) Inventors: Manoj Sharma, Troy, MI (US); Jacob Alan Bond, Rochester Hills, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 18/066,008

(22) Filed: Dec. 14, 2022

(65) Prior Publication Data
US 2024/0203084 A1    Jun. 20, 2024

(51) Int. Cl.
| | |
|---|---|
| G06V 10/26 | (2022.01) |
| G06T 5/77 | (2024.01) |
| G06V 10/25 | (2022.01) |
| G06V 10/764 | (2022.01) |
| G06V 10/82 | (2022.01) |

(52) U.S. Cl.
CPC ............ *G06V 10/25* (2022.01); *G06T 5/77* (2024.01); *G06V 10/26* (2022.01); *G06V 10/764* (2022.01); *G06V 10/82* (2022.01); G06T 2207/30256 (2013.01)

(58) Field of Classification Search
None
See application file for complete search history.

(56) References Cited

U.S. PATENT DOCUMENTS

| | | | |
|---|---|---|---|
| 11,919,391 B2* | 3/2024 | Yamada | B60K 35/213 |
| 2015/0172633 A1* | 6/2015 | Nobori | G06V 20/10 |
| | | | 901/1 |
| 2021/0174767 A1* | 6/2021 | Edgren | G02B 27/01 |
| 2021/0370773 A1* | 12/2021 | Oba | G06V 20/597 |
| 2022/0019225 A1* | 1/2022 | Foley | G06V 10/806 |
| 2023/0351773 A1* | 11/2023 | Chen | G06V 10/82 |

\* cited by examiner

*Primary Examiner* — Sath V Perungavoor
*Assistant Examiner* — Paramita Ghosh
(74) *Attorney, Agent, or Firm* — Vivacqua Crane, PLLC (57) ABSTRACT

A system and method for selectively augmenting information in a vehicle includes receiving a scene information from at least one sensor, identifying a region of interest from the scene information, analyzing the scene information to determine whether the region of interest is occluded, and augmenting the region of interest using a display system when the region of interest is occluded. The region of interest includes an object identified within the scene information that is classified as related to vehicle safety.

18 Claims, 4 Drawing Sheets

SYSTEM AND METHOD FOR AUGMENTED DECISION MAKING BY DETECTING OCCLUSIONS

INTRODUCTION

The present disclosure relates to displaying augmented information to an occupant of a vehicle, and more particularly to a system and method for determining when to display information based on detecting an occlusion.

Augmented reality (AR) involves enhancing the real world with virtual elements that are shown in three-dimensional space and that permit real-time interaction with occupants. A head-up display (HUD) shows information such as, for example, vehicle speed and navigational instructions, directly onto a windscreen of a vehicle within the occupant's forward field of view. Accordingly, the head-up display provides occupants with information without looking away from the road. Augmented reality head-up displays (AR-HUD) for vehicles have become popular in helping drivers to navigate the road by overlaying images on the windscreen. These augmentations enhance an occupant's view of the environment outside the vehicle to create a greater sense of environmental awareness. Enhanced environmental awareness may be especially important for occupants having a disability such as, for example, color-vision impairment. However, providing too much augmentation via the AR-HUD or other display may be overwhelming to an occupant.

Thus, while in-vehicle AR-HUDs and other displays achieve their intended purpose of providing the occupants with more information about the environment outside the vehicle, there is a need in the art for an automated decision-making system which prevents over augmentation and avoids overpopulating the AR-HUD or other display.

SUMMARY

According to several aspects, a method for selectively augmenting information in a vehicle is provided. The method includes receiving a scene information from at least one sensor, identifying a region of interest from the scene information, and analyzing the scene information to determine whether the region of interest is occluded. The method augments the region of interest using a display system when the region of interest is occluded.

In an additional aspect of the present disclosure, the scene information includes data pertaining to an environment surrounding the vehicle.

In an additional aspect of the present disclosure the region of interest includes an object identified within the scene information that is classified as related to vehicle safety.

In an additional aspect of the present disclosure, the object identified within the scene information related to vehicle safety includes a road sign, a brake light, a pedestrian, a traffic light, and a traffic sign.

In an additional aspect of the present disclosure, the region of interest includes an object identified by an occupant demand for augmentation.

In an additional aspect of the present disclosure, identified by an occupant demand for augmentation includes preferences for augmentation set by the occupant.

In an additional aspect of the present disclosure, identifying a region of interest includes passing the scene information through a neural network.

In an additional aspect of the present disclosure, analyzing the scene information includes passing the scene information through a neural network to determine whether the region of interest is occluded.

In an additional aspect of the present disclosure, the region of interest is occluded when the region of interest is blocked or missing.

In an additional aspect of the present disclosure, the region of interest is occluded when the region of interest is blocked or missing greater than a predetermined occlusion threshold.

In an additional aspect of the present disclosure, the method for analyzing the scene information further includes identifying whether the region of interest contains a traffic light. Moreover, the method includes determining the traffic light state. The method then includes converting an RGB light of the traffic light to an intensity image. Additionally, the method includes calculating contrast values of the of the intensity image. Moreover, the method then includes determining whether the contrast values are less than a contrast threshold. Finally, the method includes augmenting the traffic light state, using the display system, when the contrast is less than the contrast threshold, or alternatively not augmenting the traffic light state, using the display system, when the contrast is greater than the contrast threshold.

In an additional aspect of the present disclosure, determining the traffic light state comprises passing the region of interest containing the traffic light through a neural network.

In an additional aspect of the present disclosure, the method for analyzing the scene further includes identifying whether the region of interest includes a pedestrian. Moreover, the method further includes determining whether the pedestrian is occluded. Finally, the method includes augmenting the region of interest, using the display system, when the pedestrian is occluded, and alternatively not augmenting the region of interest, using the display system, when the pedestrian is not occluded.

In an additional aspect of the present disclosure, the method for analyzing the scene information further includes identifying whether the region of interest includes a traffic sign. Moreover, the method includes determining a type of traffic sign by passing the scene information through a neural network. Additionally, the method includes determining whether the traffic sign is occluded. Finally, the method includes augmenting the type of traffic sign, using the display system, when the traffic sign is occluded, and alternatively not augmenting the traffic sign type, using the display system, when the traffic sign is not occluded.

In an additional aspect of the present disclosure, the method for analyzing the scene information further comprises identifying a road marker in the region of interest. Moreover, the method includes determining whether the road marker is occluded. Finally, the method includes augmenting the road marker, using the display system, when the road marker is occluded, and alternatively not augmenting the road marker, using the display system, when the road marker is not occluded.

In an additional aspect of the present disclosure, the method for analyzing the scene information further includes identifying whether the region of interest contains a remote vehicle in front of the vehicle. Moreover, the method includes detecting whether the remote vehicle is decelerating. Additionally, the method includes detecting whether brake lights on the remote vehicle are occluded. Finally, the method includes augmenting the brake lights based on the determination that the remote vehicle is decelerating and the brake lights are occluded, and alternatively not augmenting the brake lights based on the determination that the remote vehicle is either not decelerating and or the brake lights are not occluded.

In an additional aspect of the present disclosure, augmenting the region of interest includes graphically removing the occlusion or displaying a graphic on or near the region of interest.

According to several aspects, a system for selectively augmenting information in a vehicle is provided. The system includes at least one sensor used to acquire information about an environment surrounding the vehicle. A display system is located in view of an occupant. A controller is in electrical communication with the at least one sensor and the display system. The controller is programed to receive a scene information from the at least one sensor, identify a region of interest from the scene information, analyze the scene information to determine whether the region of interest is occluded, and augment the region of interest, using the display system, when the region of interest is occluded.

In an additional aspect of the present disclosure, the at least one sensor includes a camera, a RADAR, a LIDAR, or a V2X. Additionally, the display system includes an AR-HUD, AR-cluster, TWD system, or a direct view display.

According to several aspects, a computer for a selective augmentation system of a vehicle is provided. The system includes an at least one sensor for acquiring information about an environment surrounding the vehicle, a display system, located in view of an occupant, for displaying augmented regions of interested to the occupant, and a controller in electrical communication with the at least one sensor and the display system for augmenting the region of interest. The controller includes at least one processor electrically communicating with the at least one sensor and the display system and a non-transitory computer readable storage medium for storing instructions. The at least one processor is programmed to receive scene information from the at least one sensor, to identify a region of interest from the scene information, to analyze the scene information to determine whether the region of interest is occluded, and to augment the region of interest using the display system when the region of interest is occluded.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
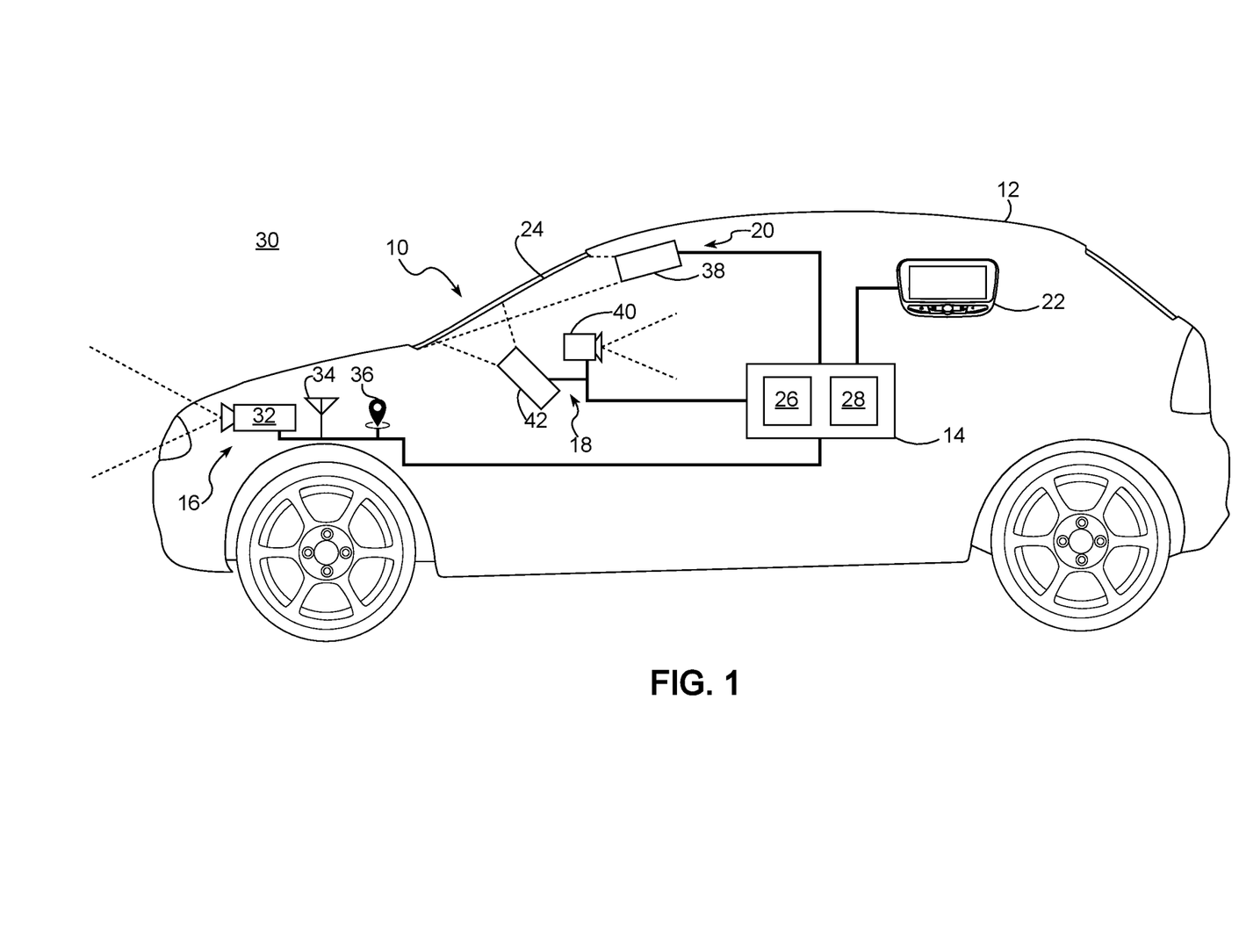
FIG. 1 is a is a schematic diagram of a system for providing information to an occupant of a vehicle according to an exemplary embodiment.

Referring to FIG. 1, a system for selectively augmenting information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, vehicle sensors 16, an augmented reality head-up display (AR-HUD) system 18, a transparent windscreen display (TWD) system 20, and a human-machine interface (HMI) 22. While the system 10 is shown as a hybrid AR-HUD, it should be appreciated that various other display systems may be employed including AR-HUD, AR-cluster, and a direct view display such as a center console display.

The controller 14 is used to implement a method 100 for selectively augmenting information to an occupant of a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and non-volatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the vehicle sensors 16, the AR-HUD system 18, the TWD system 20, and the HMI 22. The electrical communication may be established using, for example, a CAN bus, a Wi-Fi network, a cellular data network, or the like. It should be understood that various additional wired and wireless techniques and communication protocols for communicating with the controller 14 are within the scope of the present disclosure.

The vehicle sensors 16 are used to acquire information about an environment 28 surrounding the vehicle 12. In an exemplary embodiment, the vehicle sensors 16 include a camera 30, a vehicle communication system 34, and a global positioning system (GPS) 36. It should be understood that the vehicle sensors 16 may include additional sensors for determining characteristics of the vehicle 12, for example, vehicle speed, roadway curvature, and/or vehicle steering without departing from the scope of the present disclosure. It should be understood that the vehicle sensors 16 may include additional sensors such as RADAR, LIDAR, and V2X for determining characteristics of the environment 28. The vehicle sensors 16 are in electrical communication with the controller 14 as discussed above.

The camera 30 is used to capture images and/or videos of the environment 28 surrounding the vehicle 12. In an exemplary embodiment, the camera 30 is a photo and/or video camera which is positioned to view the environment 28 in front of the vehicle 12. In one example, the camera 30 is affixed inside of the vehicle 12, for example, in a headliner of the vehicle 12, having a view through a windscreen 32 of the vehicle 12. In another example, the camera 30 is affixed outside of the vehicle 12, for example, on a roof of the vehicle 12, having a view of the environment 28 in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 34 is used by the controller 14 to communicate with other systems external to the vehicle 12. For example, the vehicle communication system 34 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 34 is a wireless communication system configured to communicate via a wireless local area network (WLAN) using IEEE 802.11 standards or by using cellular data communication. However, additional, or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 34 may include one or more antennas and/or communication transceivers for receiving and/or transmitting signals, such as cooperative sensing messages (CSMs). The vehicle communication system 34 is configured to wirelessly communicate information between the vehicle 12 and another vehicle. Further, the vehicle communication system 34 is configured to wirelessly communicate information between the vehicle 12 and infrastructure or other vehicles.

The GPS 36 is used to determine a geographical location of the vehicle 12. In an exemplary embodiment, the GPS 36 includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. It should be understood that various additional types of satellite-based radionavigation systems, including additional types of global navigation satellite systems (GNSS) are within the scope of the present disclosure.

The AR-HUD system 18 is used to augment visual information by displaying AR-HUD graphics (i.e., notification symbols providing visual information to the occupant) on the windscreen 32 of the vehicle 12. Examples of AR-HUD graphics and augmentations are shown in FIGS. 3A and 3B and will be discussed below. The AR-HUD system 18 includes an AR-HUD projector 38 and an occupant position tracking device 40. The AR-HUD system 18 is in electrical communication with the controller 14 as discussed above.

The AR-HUD projector 38 is used to project the AR-HUD graphics on the windscreen 32 of the vehicle 12. It should be understood that various devices designed to project images including, for example, optical collimators, laser projectors, digital light projectors (DLP), and the like are within the scope of the present disclosure.

The occupant position tracking device 40 is used to determine a position of the occupant in the vehicle 12. For example, the occupant position tracking device 40 may track a position of a head or eyes of the occupant. The position of the occupant in the vehicle 12 relative to the occupant position tracking device 40 is used to locate the AR-HUD graphic on the windscreen 32 of the vehicle 12. In an exemplary embodiment, the occupant position tracking device 40 is one or more cameras disposed in the vehicle 12.

The TWD system 20 is used to display images on the windscreen 32 of the vehicle 12. In an exemplary embodiment, the AR-HUD system 18 can display the AR-HUD graphics in a predefined region of the windscreen 32. The TWD system 20 can display TWD graphics (not shown) in any region of the windscreen 32. Therefore, by operating the AR-HUD system 18 and the TWD system 20 in conjunction, the controller 14 may display graphics in any region of the windscreen 32. In an exemplary embodiment, the TWD system 20 includes transparent phosphors (not shown) embedded into the windscreen 32 and a TWD projector 42. The TWD system 20 is in electrical communication with the controller 14 as discussed above.

The transparent phosphors are light emitting particles which fluoresce in response to being excited by the TWD projector 42. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 42 is used to excite the transparent phosphors in a predetermined pattern to produce the TWD graphics on the windscreen 32. In an exemplary embodiment, the TWD projector 42 is a violet/ultraviolet laser projector disposed proximally to the headliner of the vehicle 12. The TWD projector 42 includes three lasers, each laser configured to excite one of the red, green, or blue transparent phosphors.

In an exemplary embodiment, the HMI 22 is used in addition to the AR-HUD system 18 and the TWD system 20 to display information to the occupant of the vehicle 12. In another exemplary embodiment, the HMI 22 is used instead of the AR-HUD system 18 and/or the TWD system 20 to display information to the occupant of the vehicle 12. In the aforementioned exemplary embodiments, the HMI 22 is a display system located in view of the occupant and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the controller 14 as discussed above.

Figure 2:
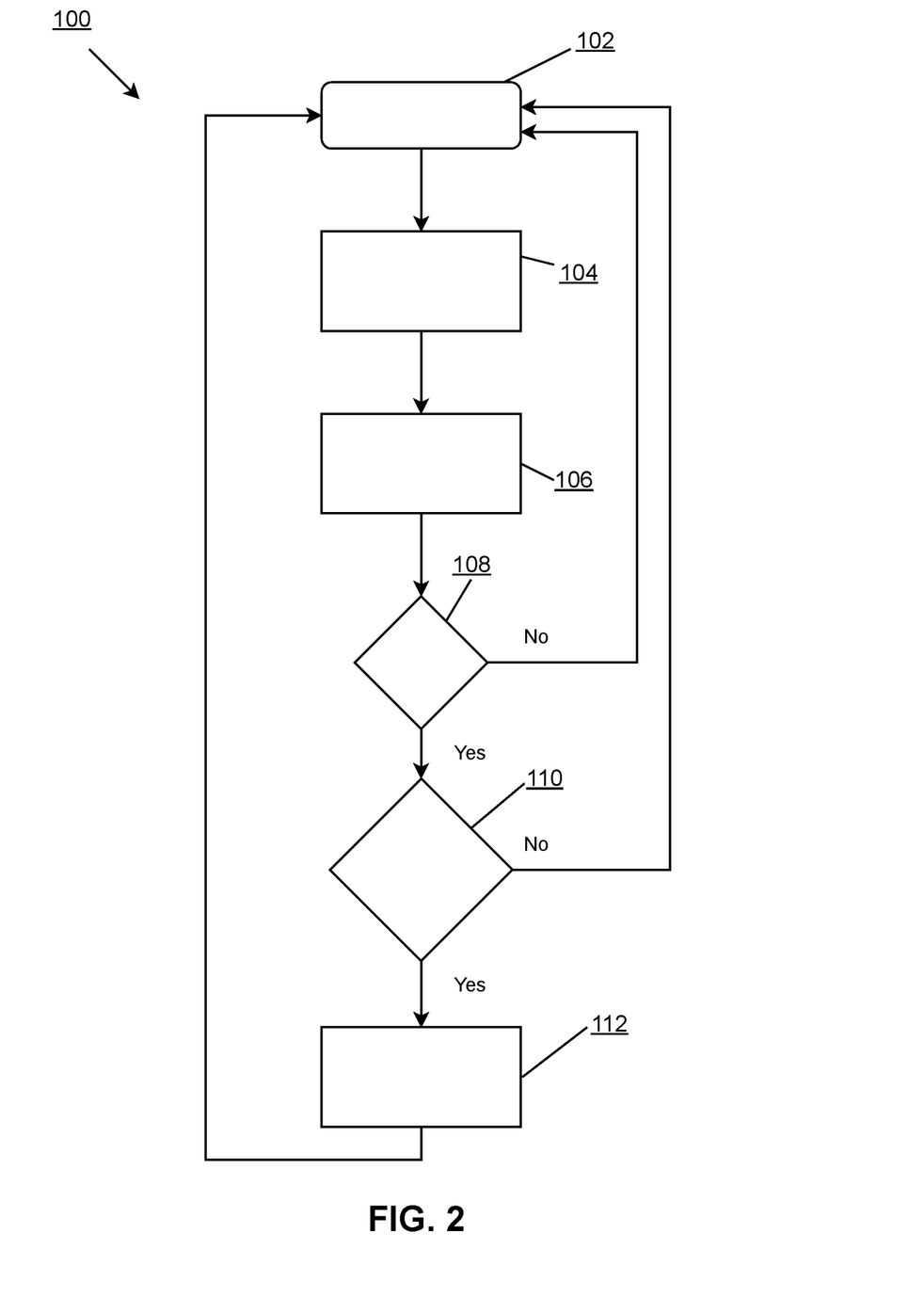
FIG. 2 is a flowchart of a method for augmenting an occluded region of interest according to an exemplary embodiment.

Referring to FIG. 2, a flowchart of the method for selectively augmenting information is generally indicated by reference number 100. The method 100 is used to determine when to augment visual information using the AR-HUD system 18, the TWD system 20, the HMI 22, or any other display device in the vehicle. The method 100 begins at block 102 and proceeds to blocks 104.

At block 104, the controller 14 receives scene information from one or more of the vehicle sensors 16. The scene information is an image or data pertaining to the surrounding environment 28 of the vehicle 12, in particular the surrounding environment 28 viewable through the windscreen 32. In one example, the scene information is an image captured by the camera 30. Where the scene information is an image, the image may include various identifiable objects and regions of interest, as will be described below. In another example, the scene information is object localization received by the vehicle communication system 34. In yet another example, the scene information is object localization received by the GPS 36. In yet another example, the scene information includes information received from other sensors including LIDAR and RADAR that detect one or more objects in front of the vehicle 12. Finally, the scene information may be a fusion of some, or all, of the information captured by the vehicle sensors 16 described above. Scene information is stored in the media 26 of the controller 14. After block 104, the method 100 proceeds to block 106.

At block 106, the controller 14 analyzes the scene information to identify a region of interest within the scene information. A region of interest is an object identified within the scene information that is classified as being considered for augmentation using the AR-HUD system 18. In the example provided, to be considered for augmentation, the object is related to vehicle safety and/or is identified by occupant demand for augmentation. In one embodiment, the decision to augment is also determined by an assessment of the occupant and the environment surrounding the vehicle 12.

An object related to safety includes, but is not limited to, traffic lights, pedestrians, traffic signs, pavement markers, and brake lights of a remote vehicle. Traffic lights include automatically operated colored light structures (typically red, yellow, and green) positioned above or along the roadway meant to control the flow of traffic at road junctions and crosswalks by illuminating to indicate the correct driver action (stopping, slowing to a stop, or proceeding through the intersection). Pedestrians include a person or pet crossing the road or moving along the road without a vehicle (e.g., walkers, jogger, or bikers). Traffic signs include structures positioned along a roadway including images and/or text to provide persons using the roadway with information about rules, laws, and/or regulations of the roadway. Pavement markings include images, colors, and/or text disposed on a surface and/or curb of the roadway to provide persons using the roadway with information about rules, laws, and/or regulations of the roadway, including lane lines.

The occupant demand for augmentation includes preferences for augmentation set or selected by an occupant of the system 10. These preferences include classifying objects that are not related to safety to be considered for augmentation. For example, the occupant may desire gas station or charging station signs to be augmented, for additional augmentation during low-light conditions, or to augment colors. In a non-limiting example, these preferences are set using the HMI 22 of the vehicle 12.

As noted above, in one embodiment the decision to augment is also determined by an assessment by the controller 14 of the occupant, the surrounding environment 28, and the occupant's travel history. The assessment of the occupant includes the age of the occupant, an alertness of the occupant based on information from the occupant position tracker 40, and a known eyesight of the occupant. For example, if the controller 14 determines that the occupant is an older occupant, an unalert occupant, and/or an occupant with poor eyesight, the controller 14 will consider more objects for augmentation. The assessment of the surrounding environment 28 may include determining if there are weather or environmental conditions that may impede the occupant's vision and augmenting based on the assessment. The assessment of the occupant's travel history includes determining, based on the occupant's GPS history, whether the occupant is in a new area and augmenting based on the assessment.

In an exemplary embodiment, the controller 14 is programmed to analyze the scene information and identify the regions of interest using a machine learning algorithm, for example, using a neural network. In a non-limiting example, the machine learning algorithm is trained by providing the algorithm with images of regions of interest, such as traffic signs and pavement markings which have been pre-classified. The images may show the regions of interest in a variety of contexts and weather conditions. After sufficient training of the machine learning algorithm, the algorithm can identify regions of interest from the scene information with a high accuracy and precision. After block 106, the method 100 proceeds to block 108.

At block 108, the controller 14 determines whether a region of interest was identified within the scene information. If at block 108 the controller 14 determines that the scene information includes a region of interest, then the method proceeds to block 110. If at block 108 the controller 14 determines that the scene information does not include a region of interest, then the method 100 returns to block 106 and the method 100 repeats.

Figure 4A:
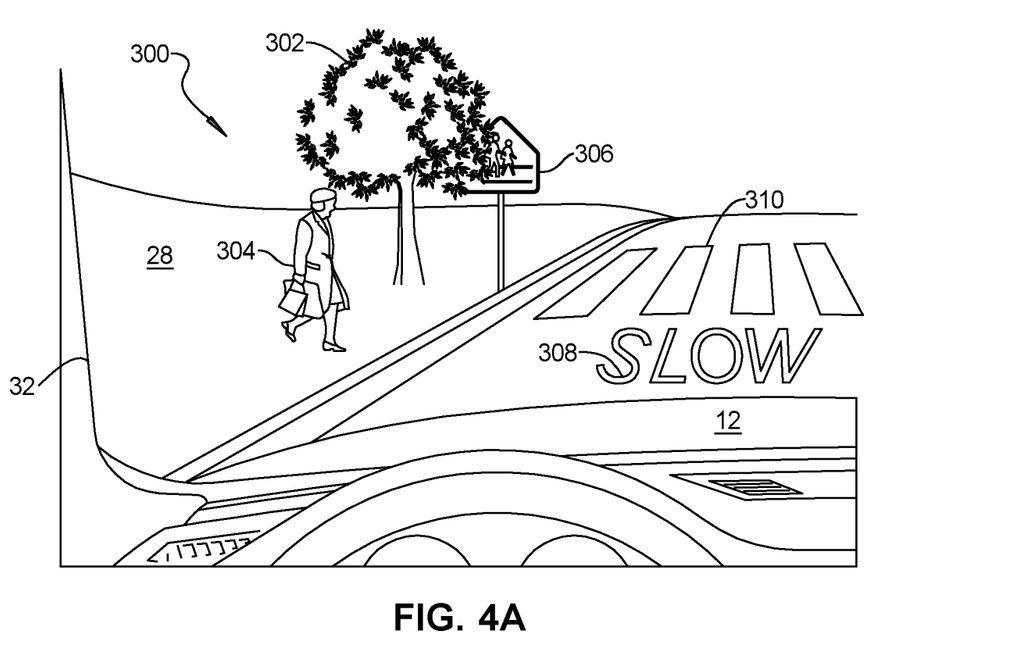
FIG. 4A is a first exemplary driving scene including an occluded traffic sign, an occluded pedestrian, and an occluded pavement marker according to an exemplary embodiment.
Figure 4B:
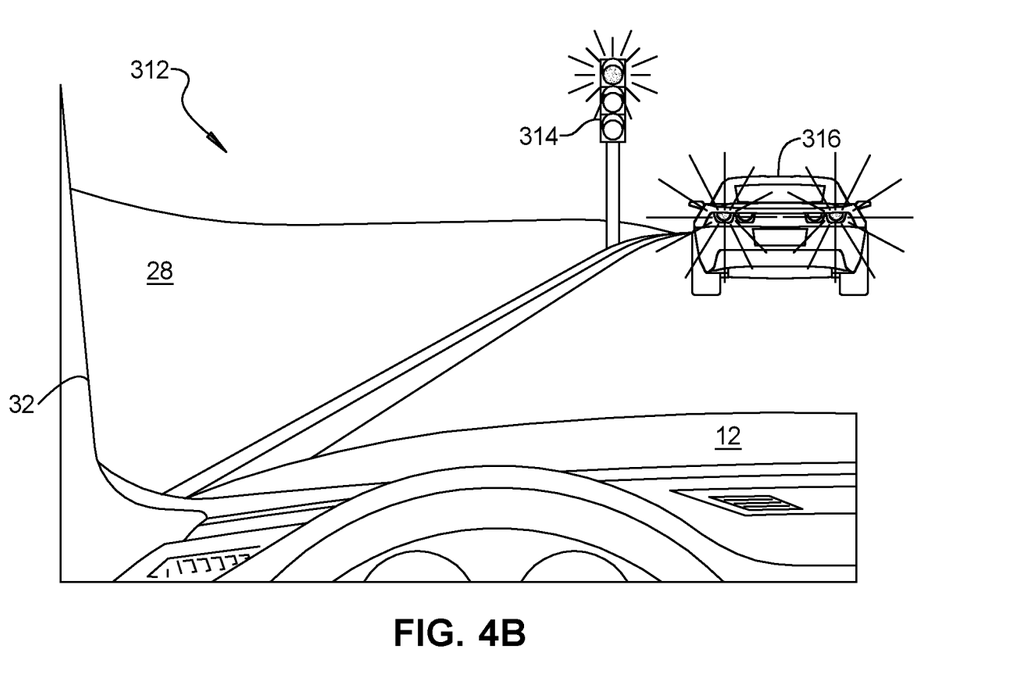
FIG. 4B is a second exemplary driving scene including an occluded traffic light and an occluded vehicle brake light according to an exemplary embodiment.

At block 110, the controller 14 analyzes the scene information to determine whether the region of interest is occluded. A region of interest is occluded when visual information related to the region of interest is blocked, missing, or otherwise not viewable by an occupant of the vehicle 12. An example of a region of interest that is blocked is a tree partially or fully obstructing a stop sign. An example of a region of interest that is missing visual information is a lane line or stop sign that is faded. An example of otherwise not viewable includes traffic lights or brake lights being washed out due to direct sunlight or other outside illumination. Examples of regions of interest that are occluded are shown in FIGS. 4A and 4B and described below. In one embodiment, the region of interest is occluded when the occlusion is greater than a predetermined occlusion threshold. For example, the predetermined occlusion threshold is 20% and therefore the controller 14 determines that the region of interest is occluded if the region of interested is more than 20% occluded (i.e., more than 20% obstructed or more than 20% visual information is missing). In another embodiment, the occupant and environmental assessment is used to adjust the predetermined occlusion threshold. For example, the predetermined occlusion threshold may be lowered if the occupant is not alert or is in a new area.

Figure 3:
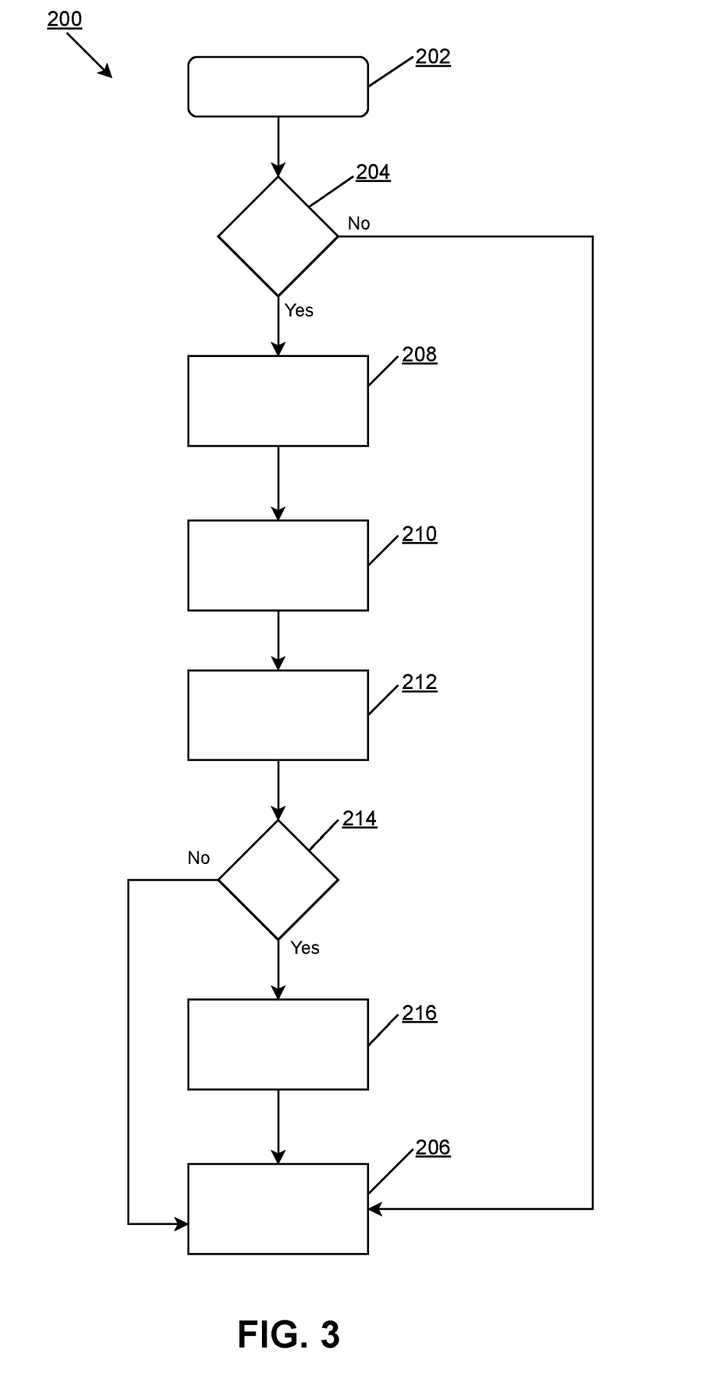
FIG. 3 is a flowchart of a method for augmenting an occluded traffic light according to an exemplary embodiment.

To determine whether the region of interest is occluded, the controller 14 uses the machine learning algorithm, for example, the neural network to detect occlusion. In one example, the controller 14 uses the occupant and environmental assessment and the occupant demand for augmentation to determine whether the occupant would be able to detect the occlusion. An example of a method for determining whether a traffic light region of interest is occluded or, more particularly washed out by direct sunlight, is shown in FIG. 3 and will be described in greater detail below. When the region of interest includes a traffic sign, V2X or map data may be used to receive information about the traffic sign if the traffic sign is fully occluded. When the region of interest includes a remote vehicle, LiDAR, RADAR, and/or V2V data may be used to determine if the remote vehicle is decelerating if the brake lights are fully occluded. When the region of interest includes road markings, GPS map data may be used to determine the road markings when the road markings are faded to a level that the road markings cannot be identified.

If the controller 14 determines that the region of interest is not occluded, then the method 100 returns to block 102 and no augmentation is performed. If the controller 14 determines that the region of interest is occluded, then the method proceeds to block 112.

At block 112, the controller 14 augments the region of interest using the AR-HUD system 18, TWD system 20, the HMI 22, or other display. The method 100, then returns to block 102 to repeat the process as the vehicle proceeds through the environment. The augmentation may include graphically removing the occlusion or displaying a graphic on or near the region of interest, as described above in reference to FIG. 1. Exemplary graphics will be discussed below in reference to FIGS. 4A and 4B.

Referring to FIG. 3, an example flowchart of a method for determining whether a traffic light region of interest is occluded or more particularly washed out by direct sunlight is indicated by reference number 200. The method 200 begins at block 202 and proceeds to block 204.

At block 204, the controller 14 uses an object detection and localization algorithm, for example machine learning, to determine whether the detected region of interest is a traffic light by analyzing the captured image or other scene information. If at block 204 the controller 14 determines the region of interest is not a traffic light, then the method 200 ends at block 206. If the controller 14 determines the region of interest is a traffic light, then the method 200 proceeds to block 208.

At block 208, the controller 14 determines a traffic light state. The traffic light state includes which lights of the traffic light are illuminated. To determine the traffic light state, a machine learning algorithm, for example, a neural network, is used to map the image of the traffic light to a traffic light status in all ambient light conditions. The traffic light status includes the various traffic light illumination conditions that are possible for a traffic light. After block 208, the method 200 proceeds to block 210.

At block 210, the controller 14 converts the image captured by the camera 30 to an intensity image (i.e., a grayscale image). The intensity image is a data matrix whose values represent possible intensities (i.e., brightness) within a range. Each pixel of the captured image is assigned a numerical value which creates the intensity image. The method 200 then proceeds to block 212.

At block 212, the controller 14 calculates a contrast value for each of the possible light states (red, green, yellow). The contrast value is the difference between the intensity image value of the captured image and a value of the GR, GY and YR (red-green, green-yellow, or yellow-red) values. The contrast value is therefore a measure of the intensity of a brightness of the traffic light in the captured image. The method 200 then proceeds to block 214.

At block 214 the controller 14 determines a difference in value between a contrast threshold and a highest of the contrast values determined at block 212. In other words, the contrast value is used to determine whether direct sunlight falling on the traffic light will impact whether an occupant will be able to see the traffic light state. The contrast threshold is a preprogrammed value used to determine whether the traffic light will be augmented using the AR-HUD system 18. If the highest contrast value is greater than the contrast threshold, then the method 200 returns to block 206 and the method 200 ends without augmenting the traffic light. If the highest contrast value is lower than the predecided threshold, the method 200 proceeds to block 216.

At block 216, the controller 14 augments the region of interest using the AR-HUD system 18, the TWD system 20, the HMI 22, or another display. The augmentation may include graphically removing the occlusion or displaying a graphic on or near the region of interest within the region of interest, as described above in reference to FIG. 1, or increasing an intensity of the illuminated traffic sign light. Exemplary graphics will be discussed below in reference to FIGS. 4A and 4B.

Referring to FIG. 4A, a first exemplary driving scene is illustrated and generally indicated by reference number 300. The first exemplary driving scene 300 depicts a view of the environment 28 from a perspective of the occupant through the windscreen 32 of the vehicle 12. The first exemplary driving scene 300 includes an occlusion 302 (i.e., a leafy tree), along with several regions of interest, including an occluded pedestrian 304, an occluded traffic sign 306 and occluded pavement markers 308 and 310. The occluded pedestrian 304 is located adjacent to the occluded traffic sign 306. The occluded traffic sign 306 includes an image conveying that pedestrians may be crossing nearby (i.e., a driving rule). The occluded road marker 308 indicates that a driver should reduce the vehicle 12 speed as a pedestrian may be crossing through the occluded cross walk 310 which is a designated area that allows pedestrians to safely cross a road. The system 10 and method 100 are used to augment these regions of interest, which are overlayed onto the respective regions of interest 304, 306, 308, and 310. Therefore, the system 10 and method 100 help to increase occupant awareness of the environment 28 surrounding the vehicle 12 by augmenting the regions of interest 304, 306, 308, and 310. Accordingly, regions of interest 304, 306, 308, and 310 in the first exemplary driving scene 300 are only augmented when the system 10 has determined that the regions of interest 304, 306, 308, and 310 are occluded, as discussed above.

Referring to FIG. 4B, a second exemplary driving scene is illustrated and generally indicated by reference number 312. The second exemplary driving scene 312 depicts a view of the environment 28 from a perspective of an occupant through the windscreen 32 of the vehicle 12. The second exemplary driving scene 312 includes an occluded traffic light (i.e., snow covered) 314 indicating that the vehicle 12 should slow down (i.e., yellow light). The second exemplary driving scene 312 also includes a set of occluded brake lights (i.e., snow covered) from a remote vehicle 316 located in front of the vehicle 12. The system 10 and method 100 are used to augment these regions of interest 314 and 316, which are overlayed onto the respective regions of interest. Therefore, the system 10 and method 100 help to increase occupant awareness of the environment 28 surrounding the vehicle 12. For example, occupants with color-deficient vision may be unable to distinguish the color of the occluded traffic lights 314. By providing augmented regions of interest 314 and 316, the system 10 and method 100 are used to improve awareness of the environment 28 for an occupant with color-deficient vision.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A method for selectively augmenting information in a vehicle, the method comprising:
   receiving a scene information from at least one sensor;
   identifying a region of interest from the scene information;
   analyzing the scene information to determine whether the region of interest is occluded by passing the scene information through a neural network;
   identifying whether the region of interest contains a traffic light;
   determining the traffic light state;
   converting a red, green, or red light of the traffic light to an intensity image;
   calculating contrast values of the of the intensity image;
   determining whether the contrast values are less than a contrast threshold;
   augmenting the traffic light state, using a display system, when the contrast is less than the contrast threshold; and
   not augmenting the traffic light state, using the display system, when the contrast is greater than the contrast threshold.

2. The method of claim 1, wherein the scene information includes data pertaining to an environment surrounding the vehicle.

3. The method of claim 1, wherein the region of interest includes an object identified within the scene information that is classified as related to vehicle safety.

4. The method of claim 3, wherein related to vehicle safety includes a road sign, a brake light, a pedestrian, the traffic light, and a traffic sign.

5. The method of claim 1, wherein the region of interest includes an object identified by an occupant demand for augmentation.

6. The method of claim 5, wherein identified by an occupant demand for augmentation includes preferences for augmentation set by the occupant.

7. The method of claim 1, wherein identifying a region of interest includes passing the scene information through a neural network.

8. The method of claim 1, wherein the region of interest is occluded when the region of interest is blocked, missing, or is not viewable by an occupant of the vehicle due to direct sunlight.

9. The method of claim 1, wherein the region of interest is occluded when the region of interest is blocked or missing greater than a predetermined occlusion threshold.

10. The method of claim 1, wherein determining the traffic light state comprises passing the region of interest containing the traffic light through a neural network.

11. The method of claim 1, wherein analyzing the scene further comprises:
    identifying whether the region of interest includes a pedestrian;
    determining whether the pedestrian is occluded;
    augmenting the region of interest, using the display system, when the pedestrian is occluded; and
    not augmenting the region of interest, using the display system, when the pedestrian is not occluded.

12. The method of claim 1, wherein analyzing the scene information further comprises:
    identifying whether the region of interest includes a traffic sign;
    determining a type of traffic sign by passing the scene information through a neural network;
    determining whether the traffic sign is occluded;
    augmenting the type of traffic sign, using the display system, when the traffic sign is occluded; and
    not augmenting the traffic sign type, using the display system, when the traffic sign is not occluded.

13. The method of claim 1, wherein analyzing the scene information further comprises:
    identifying a road marker in the region of interest;
    determining whether the road marker is occluded;
    augmenting the road marker, using the display system, when the road marker is occluded; and
    not augmenting the road marker, using the display system, when the road marker is not occluded.

14. The method of claim 1, wherein analyzing the scene information further comprises:
    identifying whether the region of interest contains a remote vehicle in front of the vehicle;
    detecting whether the remote vehicle is decelerating;
    detecting whether brake lights on the remote vehicle are occluded;
    augmenting the brake lights based on the determination that the remote vehicle is decelerating and the brake lights are occluded; and
    not augmenting the brake lights based on the determination that the remote vehicle is either not decelerating and or the brake lights are not occluded.

15. The method of claim 1, augmenting the region of interest includes graphically removing the occlusion or displaying a graphic on or near the region of interest.

16. A system for selectively augmenting information in a vehicle, the system comprising:
    at least one sensor, wherein the at least one sensor is used to acquire information about an environment surrounding the vehicle;
    a display system located in view of an occupant; and
    a controller in electrical communication with the at least one sensor and the display system, wherein the controller is programed to:
    receive a scene information from the at least one sensor;
    identify a region of interest from the scene information;
    analyze the scene information to determine whether the region of interest is occluded by passing the scene information through a neural network;
    identify whether the region of interest contains a traffic light;

determining the traffic light state;
   convert a red, green, or red light of the traffic light to an intensity image;
   calculate contrast values of the of the intensity image;
   determine whether the contrast values are less than a contrast threshold;
   augment the traffic light state, using a display system, when the contrast is less than the contrast threshold; and
   do not augment the traffic light state, using the display system, when the contrast is greater than the contrast threshold.

17. The system of claim 16, wherein the at least one sensor includes a camera, a RADAR, a LIDAR, or a V2X and wherein the display system includes an AR-HUD, AR-cluster, TWD system, or a direct view display.

18. A computer for a selective augmentation system of a vehicle, the system notifying an occupant of the vehicle about an occluded region of interest, the system further including an at least one sensor for acquiring information about an environment surrounding the vehicle, the system further including a display system, located in view of an occupant, for displaying augmented regions of interested to the occupant, the system further including a controller in electrical communication with the at least one sensor and the display system, for augmenting the region of interest, the controller comprising:

at least one processor electrically communicating with the at least one sensor and the display system; and
a non-transitory computer readable storage medium storing instructions such that the at least one processor is programmed to:
   receive a scene information from the at least one sensor;
   identify a region of interest from the scene information;
   analyze the scene information to determine whether the region of interest is occluded by passing the scene information through a neural network;
   identify whether the region of interest contains a traffic light;
   determine the traffic light state;
   convert a red, green, or red light of the traffic light to an intensity image;
   calculate contrast values of the of the intensity image; and
   determine whether the contrast values are less than a contrast threshold;
   augment the traffic light state, using a display system, when the contrast is less than the contrast threshold; and
   do not augment the traffic light state, using the display system, when the contrast is greater than the contrast threshold.

* * * * *